United States Patent
Li (10) Patent No.: US 9,817,405 B2
(45) Date of Patent: Nov. 14, 2017

(54) CARGO TRANSPORT SYSTEM AND METHOD BASED ON UNMANNED AERIAL VEHICLE

(71) Applicants: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

(72) Inventor: Shufu Li, Hangzhou (CN)

(73) Assignees: Zhejiang Geely Holding Group Co., Ltd., Hangzhou (CN); Zhejiang Geely Automobile Research Institute Co., Ltd., Taizhou (CN)

( * ) Notice: Subject to any disclaimer, the term of this patent is extended or adjusted under 35 U.S.C. 154(b) by 0 days.

(21) Appl. No.: 15/300,038

(22) PCT Filed: Mar. 5, 2015

(86) PCT No.: PCT/CN2015/073711
§ 371 (c)(1),
(2) Date: Sep. 28, 2016

(87) PCT Pub. No.: WO2015/143977
PCT Pub. Date: Oct. 1, 2015

(65) Prior Publication Data
US 2017/0139424 A1   May 18, 2017

(30) Foreign Application Priority Data
Mar. 28, 2014   (CN) .......................... 2014 1 0123812

(51) Int. Cl.
*G05D 1/00* (2006.01)
*G05D 1/06* (2006.01)
(Continued)

(52) U.S. Cl.
CPC .......... *G05D 1/0684* (2013.01); *B64C 39/00* (2013.01); *G06Q 10/083* (2013.01);
(Continued)

(58) Field of Classification Search
None
See application file for complete search history.

(56) References Cited

U.S. PATENT DOCUMENTS 6,854,410 B1   2/2005   King et al.
2008/0082210 A1   4/2008   Kim et al.
(Continued)

FOREIGN PATENT DOCUMENTS

CN   102176289 A   9/2011
CN   102687035 A   9/2012
(Continued)

OTHER PUBLICATIONS

Extended European Search Report for European Patent Application No. 15768689.0 dated Feb. 1, 2017, 5 pages.
(Continued)

*Primary Examiner* — James M McPherson
(74) *Attorney, Agent, or Firm* — Alston & Bird LLP (57) ABSTRACT

A cargo transport system includes a UAV and a vehicle for sending and receiving the UAV. The UAV has a navigation system for guiding the UAV to fly to transport cargos between the vehicle and a terminal according to first navigation position information of the vehicle and the terminal. The vehicle includes a UAV accommodating device and a UAV receiving controller for guiding the UAV to the vehicle based on wireless signal transmitted directly between them when the UAV flies into a preset range around the vehicle. The UAV receiving controller includes: an identity verification unit for providing information to the UAV in response to a request broadcasted by the UAV to determine whether
(Continued)

the vehicle is a target vehicle where the UAV is to land; and a short distance guide unit which provides information for guiding the UAV to land when the vehicle is the target vehicle.

18 Claims, 2 Drawing Sheets

(51) Int. Cl.
 *G06Q 10/08* (2012.01)
 *B64C 39/00* (2006.01)
 *G08G 5/00* (2006.01)
(52) U.S. Cl.
 CPC ......... *G08G 5/0013* (2013.01); *G08G 5/0026* (2013.01); *G08G 5/0069* (2013.01)

(56) References Cited

U.S. PATENT DOCUMENTS

| | | | |
|---|---|---|---|
| 2008/0270020 A1 | 10/2008 | Raab | |
| 2009/0085773 A1 | 4/2009 | Sin et al. | |
| 2011/0178811 A1* | 7/2011 | Sheridan | G01C 21/362 |
| | | | 705/1.1 |
| 2013/0002476 A1 | 1/2013 | Laine | |
| 2015/0025797 A1* | 1/2015 | Hardesty | G05D 1/0684 |
| | | | 701/469 |
| 2016/0244135 A1* | 8/2016 | Farber | B63G 8/001 |
| 2017/0001732 A1* | 1/2017 | Lim | G05D 1/0684 |

FOREIGN PATENT DOCUMENTS

| | | |
|---|---|---|
| CN | 203269096 U | 11/2013 |
| CN | 203402041 U | 1/2014 |
| CN | 103640697 A | 3/2014 |
| CN | 103914076 A | 7/2014 |
| DE | 10 2010 038661 A1 | 2/2012 |
| EP | 2 433 867 A2 | 3/2012 |
| FR | 2 986 647 A3 | 8/2013 |
| KR | 20090032804 A | 4/2009 |
| WO | WO 2007 054410 A1 | 5/2007 |
| WO | WO-2013/055265 A1 | 4/2013 |

OTHER PUBLICATIONS

International Search Report and Written Opinion for Application No. PCT/CN2015/073711 dated Jun. 10, 2015.

Office Action for Chinese Application No. 201410123812.5 dated Aug. 30, 2016.

* cited by examiner

CARGO TRANSPORT SYSTEM AND METHOD BASED ON UNMANNED AERIAL VEHICLE

FIELD OF THE INVENTION

The present invention relates to the field of logistics, in particular to a cargo transport system and method based on an unmanned aerial vehicle.

BACKGROUND OF THE INVENTION

With the rapid development of the vehicle industry, due to the use of motor vehicles, especially family cars, people may travel very conveniently, and meanwhile, people spend more and more time in the vehicles. Therefore, it may be considered to fully utilize such time in the vehicles for such as online shopping to meet daily needs or emergency needs. In addition, when keys, important documents or the like is forgotten, more time may be delayed if driving back halfway to get the same.

At present, with the growing maturity of the unmanned aerial vehicle (UAV) technology, simple cargo transport between two stationary user terminals through an UAV has emerged in the field of transport. However, the existing family car cannot conveniently carry the UAV always; and furthermore, the simple cargo transport mode of the UAV cannot meet the requirements of transporting and receiving cargos when the vehicle is parked at any location in the case that the vehicle is used as the user terminal. On one hand, this is because, the position information of a target vehicle obtained by positioning the target vehicle via the traditional GPS is not accurate enough, such that the cargo transport accuracy of the UAV guided by the position information cannot be guaranteed; and on the other hand, many other vehicles may simultaneously exist within a relatively small range around the target vehicle, if no more accurate position information is provided, it is hard to guarantee the accurate delivery of the cargo by the UAV, and the cargo is liable to be lost or obtained by users of non-target vehicles, so the transport safety cannot be guaranteed.

SUMMARY OF THE INVENTION

One purpose of the present invention is to provide a cargo transport system and method based on an UAV, which can transport cargos by the UAV to a vehicle that needs the cargos and can receive the UAV.

According to one aspect of the present invention, a cargo transport system based on an UAV is provided, including the UAV and a vehicle that can send and receive the UAV, so that cargos can be transported between the vehicle and another terminal by the UAV; wherein the UAV is provided with a navigation system, and the navigation system can guide the UAV to fly between the vehicle and the another terminal according to first navigation position information that indicates the position of the vehicle and/or the another terminal;

the vehicle includes:

an UAV accommodating device, used for accommodating the UAV; and an UAV receiving controller, configured to guide the UAV to the vehicle based on wireless signal transmitted directly between the vehicle and the UAV, when the UAV flies from the another terminal to a preset range around the vehicle by means of the navigation system;

wherein the UAV receiving controller includes:

an identity verification unit, used for responding to an identity verification request, which is broadcasted by the UAV when flying to the preset range, and providing identity verification information to the UAV, so that the UAV determines according to the identity verification information whether the vehicle is a target vehicle where the UAV is to land; and a short distance guide unit, used for providing short distance guide information for the UAV, so that the UAV lands according to the short distance guide information, when the UAV determines that the vehicle is the target vehicle. Further, the vehicle further includes a position information transceiver, used for transmitting the first navigation position information between the vehicle and the another terminal by a wireless communication network;

wherein the position information transceiver includes:

a position information obtaining unit, configured to obtain the first navigation position information for the vehicle;

a position information sending unit, configured to send the first navigation position information of the vehicle to the another terminal via the wireless communication network; and a position information receiving unit, configured to receive the first navigation position information of the another terminal through the wireless communication network.

Further, the navigation system of the UAV includes a satellite navigation system; and optionally, the satellite navigation system is a GPS navigation system or a Beidou satellite navigation system, and the first navigation position information of the terminal and the another terminal is respectively corresponding GPS position information or Beidou positioning position information.

Further, the preset range is set according to the first navigation position information of the vehicle; and optionally, the preset range is set as a spherical area range centered in a position corresponding to the first navigation position information of the vehicle and with a radius of 30-200 m.

Further, the short distance guide information includes flight control information used for controlling the flight of the UAV; the UAV receiving controller further includes a manual manipulation unit used for controlling the flight of the UAV;

wherein the short distance guide unit converts an operation of an operator on the manual manipulation unit into the flight control information and provides the flight control information to the UAV in real time, so that the UAV flies according to the operation of the operator in real time; and optionally, the UAV receiving controller is constructed into a form of a hand-held flight remote controller.

Further, the short distance guide information includes second navigation position information for positioning a landing position of the UAV, and the navigation system of the UAV navigates the UAV according to the second navigation position information to guide the UAV to land; and optionally, the position accuracy of the second navigation position information is higher than that of the first navigation position information.

Further, the short distance guide unit includes a light emitting device, and an optical mark formed by the light emitting device during light emission constitutes the second navigation position information.

Further, the light emitting device includes a plurality of infrared diodes; and optionally, the plurality of infrared diodes are arranged around the UAV accommodating device, so that the UAV can directly lands into the UAV accommodating device.

Further, the short distance guide unit is also used as a wireless signal transceiver unit for transmitting the wireless signal between the vehicle and the UAV; wherein the second navigation position information is provided by the wireless signal itself; and optionally, the wireless signal is a UWB wireless communication signal.

Further, the vehicle further includes an UAV sending controller, used for controlling the UAV to take off from the vehicle; wherein the UAV sending controller includes:

a navigation setting unit, used for providing a navigation parameter for the UAV, which is necessary for the UAV to fly from the vehicle to the another terminal. Further, the UAV accommodating device includes:

an accommodating cabin with an opening, which is arranged at a top surface of the vehicle and is used for accommodating the UAV;

a cabin door, which is arranged at the opening of the accommodating cabin and is movable between an open position and a closed position to open or close the accommodating cabin; and a cabin door controller, configured to automatically control the opening and closing of the cabin door when the UAV takes off from or lands into the accommodating cabin, so as to allow the UAV to access the accommodating cabin through the opening. Further, the UAV accommodating device has two adjacent parking spots each of which is for one UAV to park.

Further, the UAV accommodating device is further provided with an inter-vehicle cargo transfer device arranged between the two parking spots for exchanging cargos between two UAVs in the case that the two UAVs are respectively parked on the two parking spots.

According to another aspect of the present invention, a cargo transport method based on an UAV is provided, for transporting cargos between a vehicle and another terminal through the UAV having a navigation system, and the method includes:

a long distance navigation step: the navigation system of the UAV guides the UAV to fly from the first terminal to the vehicle according to first navigation position information of the vehicle; wherein cargos to be transported from the another terminal to the vehicle are loaded on the UAV;

a verification request broadcast step: an identity verification request is broadcasted from the UAV when the UAV flies into a preset range around the vehicle; wherein the preset range is set according to the first navigation position information of the vehicle; a verification response step: within the broadcast range of the identity verification request of the UAV, individual terminals, including the vehicle, respectively respond to the identity verification request to provide identity verification information to the UAV;

an identity verification step: the UAV carries out identity verification on the received identity verification information, and determines a terminal passing the identity verification as a target terminal where the UAV is to land; and a short distance guide step: in the case that the UAV determines the vehicle as the target terminal, the UAV lands according to short distance guide information sent by the vehicle.

Optionally, in the short distance guide step, the short distance guide information includes flight control information used for controlling the flight of the UAV, and the vehicle at least partially controls the flight of the UAV by the flight control information to guide the UAV to land.

Optionally, in the short distance guide step, the short distance guide information includes second navigation position information for positioning a landing position of the UAV, and the navigation system of the UAV navigates the UAV according to the second navigation position information to guide the UAV to land; wherein the position accuracy of the second navigation position information is higher than that of the first navigation position information.

Optionally, in the short distance guide step, the UAV directly lands into an UAV accommodating device arranged at a top surface of the vehicle.

Optionally, in the identity verification step, in the case that none of all identity verification information received by the UAV can pass the identity verification, the UAV automatically returns to the another terminal that serves as a starting point. According to the cargo transport system and method based on an UAV of the present invention, the sending and receiving of the UAV may be controlled by the vehicle, and the UAV may be accommodated in the UAV accommodating device at the top surface on the vehicle. In addition, the vehicle may further provide the identity verification information and the short distance guide information to the UAV by the identity verification unit and the short distance guide unit, so that the UAV may determine the target vehicle and accurately land at the target vehicle.

According to the following detailed description of specific embodiments of the present invention in combination with drawings, those skilled in the art will better understand the aforementioned and other purposes, advantages and features of the present invention.

BRIEF DESCRIPTION OF THE DRAWINGS

Some specific embodiments of the present invention will be described below in an exemplary rather than a restrictive mode with reference to drawings. Identical reference symbols in the drawings mark identical or similar components or parts. Those skilled in the art should understand that these drawings are not necessarily drawn to scale. In the drawings.

DETAILED DESCRIPTION OF THE EMBODIMENTS

Figure 1:
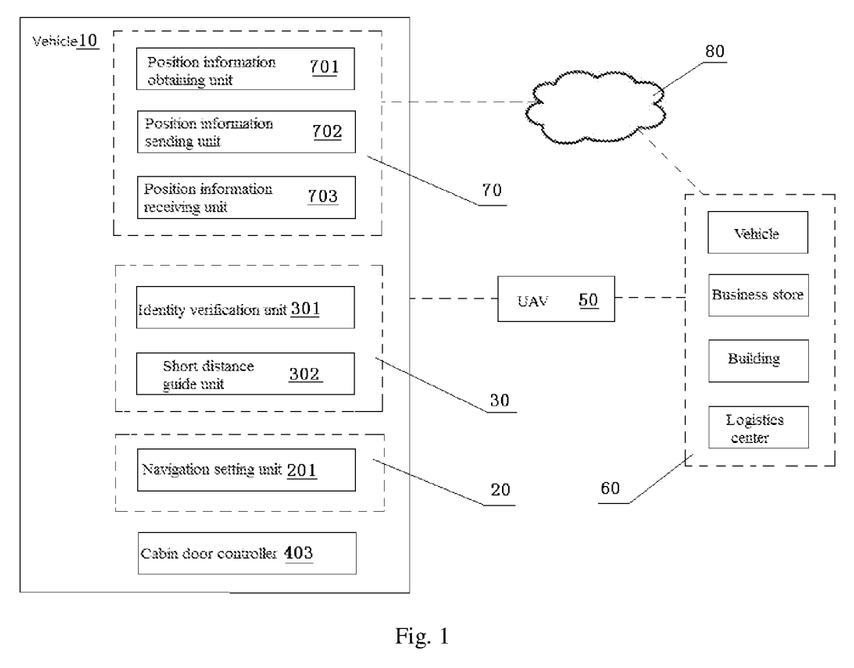
FIG. 1 is a schematic diagram of a cargo transport system based on an UAV according to one embodiment of the present invention.

FIG. 1 is a schematic diagram of a cargo transport system based on an UAV according to one embodiment of the present invention, and it mainly shows the composition of a control system of a vehicle 10. As shown in FIG. 1, the cargo transport system may include an UAV 50 and a vehicle 10 that can send and receive the UAV 50, so that cargos may be transported between the vehicle 10 and another terminal 60 by means of the UAV 50. The another terminal 60 may be a business store, another vehicle similar to the vehicle 10, a building where a family or a unit is located, a logistics center or any other appropriate terminals that can send or receive the UAV 50. The UAV 50 may be provided with a navigation system, in order to autonomously fly between the vehicle 10 and the another terminal 60. It should be understood that, the present application is not intended to contain improvements to the UAV 50 and the navigation system thereof, but any appropriate UAV 50 and the corresponding navigation system in the prior art may be adopted.

Figure 2:
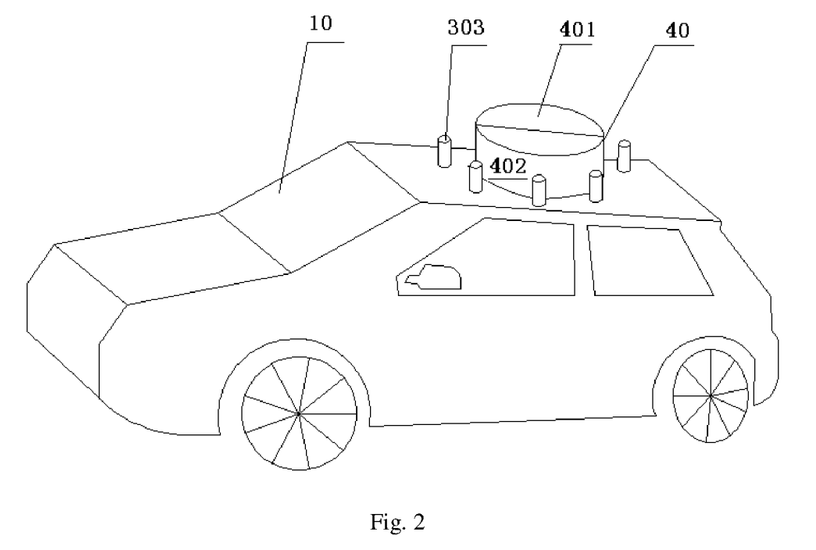
FIG. 2 is a schematic diagram of structure of a vehicle in a cargo transport system based on an UAV according to one embodiment of the present invention.

FIG. 2 is a schematic diagram of structure of the vehicle 10 according to one embodiment of the present invention. As shown in FIG. 2, the vehicle 10 of the present invention may include an UAV accommodating device 40, which is used for accommodating the UAV 50 and may be fixed on the vehicle 10 in the form of an independent member or may be pre-integrated with the vehicle 10. By adopting the UAV accommodating device 40, the vehicle 10 may conveniently carry an UAV 50. The UAV accommodating device 40 may include a cabin door 401 and an accommodating cabin 402 under the cabin door 401 for accommodating the UAV 50. The accommodating cabin 402 may be arranged at a top surface of the vehicle 10, and the shape and the size thereof may be set according to the shape and the size of the UAV 50 to be accommodated. The cabin door 401 may be arranged at an opening of the accommodating cabin 402 and can move between an open position and a closed position to correspondingly open or close the accommodating cabin 402. The UAV accommodating device 40 may further include a cabin door controller 403 as shown in FIG. 1, the cabin door controller 403 may automatically control the opening and closing of the cabin door 401 when the UAV 50 takes off from or lands to the accommodating cabin 402, so as to allow the UAV 50 to access the accommodating cabin 402 through the opening of the accommodating cabin 402. The UAV accommodating device 40 may further include a charging unit (not shown) arranged in the accommodating cabin 402, so as to charge the UAV 50 as required when the UAV 50 is located in the accommodating cabin 402.

As shown in FIG. 1, a control part of the vehicle 10 for the UAV 50 may include an UAV sending controller 20 and an UAV receiving controller 30. The UAV sending controller 20 is mainly used for controlling the UAV 50 to take off from the vehicle 10. The UAV receiving controller 30 is mainly used for guiding the UAV 50 to accurately land onto a desired location when the UAV 50 flies to the vicinity of the vehicle 10 from a distance, for example from the another terminal 60. For example, the UAV may directly land into the accommodating cabin 402 of the UAV accommodating device 40.

It may be understood that, when the UAV 50 flies between the vehicle 10 and the another terminal 60, a navigation system of the UAV 50 generally needs to know a position information for indicating the position of a destination (the vehicle 10 and/or the another terminal 60) thereof in advance, in order to guide the flight of the UAV 50. To distinguish from the position information (i.e., second navigation position information described below) used by the UAV receiving controller 30 for guiding the UAV 50 to accurately land in one embodiment to be described below, the position information herein is called first navigation position information. When the navigation system of the UAV 50 includes a satellite navigation system, for example, a GPS navigation system, the first navigation position information may be GPS position information. The satellite navigation system may also be a Beidou satellite navigation system, and then the first navigation position information may be position information that is correspondingly used in the navigation system, which may be called Beidou positioning position information.

Although the first navigation position information of the vehicle 10 or the another terminal 60 may be used as known information to be directly input to the navigation system of the UAV 50 under certain circumstances, it is preferable that a position information transceiver 70 is arranged at the vehicle 10. The position information transceiver 70 may transmit the first navigation position information between the vehicle 10 and the another terminal 60 via a wireless communication network 80. As shown in FIG. 1, the position information transceiver 70 may include a position information obtaining unit 701, a position information sending unit 702 and a position information receiving unit 703. The position information obtaining unit 701 is used for obtaining the current first navigation position information of the vehicle 10. For example, the position information obtaining unit 701 may include a GPS positioner or a Beidou positioner to obtain the current GSP position information or Beidou positioning position information of the vehicle 10 to serve as the first navigation position information. In the case that the vehicle 10 is a cargo consignee, the position information sending unit 702 may send the first navigation position information of the vehicle 10 to the another terminal 60 via the wireless communication network 80. In the case that the vehicle 10 is a cargo consignor, the position information receiving unit 703 may receive from the another terminal 60 its first navigation position information via the wireless communication network 80.

The UAV sending controller 20 may be separated from or integrated with other controllers of the vehicle 10. The UAV sending controller 20 may include a navigation setting unit 201, used for providing to the UAV 50 navigation parameters necessary for the navigation system of the UAV 50 when the UAV flies from the vehicle 10 to the another terminal 60. When the vehicle 10 serves as the cargo consignor, the navigation parameter provided by the navigation setting unit 201 for the UAV 50 may generally include the first navigation position information of the another terminal 60 which serves as the cargo consignee. In this way, the navigation system of the UAV 50 may guide the UAV 50 to autonomously fly from the vehicle 10, until arriving at a location corresponding to the first navigation position information of the another terminal 60. Of course, the navigation setting unit may also provide other navigation parameters to the UAV 50, for example, a flight route, a flight height and the like planned by an operator. For example, as to the UAV for cargo transport particularly applied to the logistics industry, the flight height of the UAV 50 may be set as about 100-200 m, so that the UAV 50 can try to avoids obstacles near the ground, such as high-rise buildings, grid lines, signal towers and the like; and the flight route of the UAV 50 may be planned to avoid downtown areas and people, and thus the UAV mainly flies over farmlands and forests.

In the present invention, for example, in the case that the vehicle 10 serves as the cargo consignee and thereby serves as a flight destination of the UAV 50, the course of the UAV 50 flying from the another terminal 60 to the vehicle 10 may be divided into two stages of "long distance navigation" and "short distance guide". The "long distance navigation" stage refers to a long distance flight course of the UAV 50 flying from the another terminal 60 to the vicinity of the vehicle 10, and this is generally the most of the distance from the another terminal 60 to the vehicle 10. In the long distance flight stage, the UAV 50 may autonomously fly by means of its self-contained navigation system based on the obtained first navigation position information of the vehicle 10. The navigation system for long distance navigation may generally include a satellite navigation system, such as the GPS navigation system. The accuracy of the satellite navigation system is not high enough (e.g., the GPS positioning accuracy is about 5-20 m) to enable the UAV 50 to accurately land at the vehicle 10 that serves as the target vehicle, particularly to directly land at the UAV accommodating device 40 of the vehicle 10. The destination determined by the UAV 50 with the satellite navigation based on the first navigation position information (e.g., the GPS position information) generally has a certain distance from the actual physical position of the vehicle 10 or particularly of the UAV accommodating device 40. Therefore, the "short distance guide" stage may be provided after the "long distance navigation" stage. It should be understood that, the "short distance guide" stage refers to a flying and landing stage when the UAV 50 is relatively close to the vehicle 10, and the positioning and/or navigation accuracy in the "short distance guide" stage is generally higher than that in the "long distance navigation" stage. The UAV receiving controller 30 of the vehicle 10 is mainly used for guiding the flight and landing of the UAV 50 in the "short distance guide" stage.

To this end, the UAV receiving controller 30 of the vehicle 10 is configured to guide the UAV 50 to the vehicle 10 based on a wireless signal that is transmitted directly between the vehicle 10 and the UAV 50 when the UAV 50 flies from the another terminal 60 to a preset range around the vehicle 10 by means of the navigation system. Herein, the preset range may be set based on the first navigation position information of the vehicle 10. In one embodiment, the preset range may be set as a spherical area range centered in a position corresponding to the first navigation position information of the vehicle 10 and with a radius of 30-200 m. When the UAV 50 enters the preset range, the UAV 50 may interact with the UAV receiving controller 30 by the wireless signal, thereby entering the "short distance guide" stage.

The UAV receiving controller 30 may include an identity verification unit 301 and a short distance guide unit 302. The identity verification unit 301 is used for providing identity verification information to the UAV 50 in response to an identity verification request broadcasted by the UAV 50 when flying to the preset range, so that the UAV 50 can determines according to the identity verification information whether the vehicle 10 is a target vehicle where the UAV is to land. In an exemplary identity verification process, when flying into the preset range of the vehicle 10, the UAV 50 broadcasts an identity verification request at first. Individual possible cargo receiving terminals (e.g., other vehicles) including the vehicle 10 within the broadcast range of the identity verification request, after receiving the request, will send respective identity verification information to the UAV 50. In the case that the current vehicle 10 is the cargo consignee, only the identity verification information of the vehicle 10 can pass the verification of the UAV 50. This may be realized by specific identity verification information that is previously agreed upon between the vehicle 10 and the another terminal 60 sending the UAV 50. For example, the identity verification information may include identity identification information, order information and/or the like that is capable of uniquely determining the identity of the vehicle 10. After the vehicle 10 passes the identity verification of the UAV 50, the short distance guide unit 302 of the UAV receiving controller 30 guides the UAV 50 to fly and land at a desired location. Specifically, the short distance guide unit 302 may provide short distance guide information to the UAV 50, so that the UAV 50 lands according to the short distance guide information when the UAV 50 determines that the vehicle 10 is the target vehicle.

According to different types of short distance guide information provided by the short distance guide unit 302, the UAV receiving controller 30 may guide the UAV 50 in different modes.

In a first embodiment, the short distance guide information may be flight control information used for controlling the flight of the UAV 50. In the embodiment, after the vehicle 10 passes the identity verification of the UAV 50, the UAV 50 authorizes at least a part of flight control rights to the UAV receiving controller 30 of the vehicle 10. At this time, the function of the UAV receiving controller 30 is similar to that of a conventional flight remote controller of for example a model airplane, and it may be provided with a manual manipulation unit (not shown) for controlling the flight of the UAV 50. The short distance guide unit 302 may convert an operation of an operator on the manual manipulation unit into the flight control information and provide the flight control information to the UAV 50 in real time, so that the UAV 50 flies according to the operation of the operator in real time. The operator may control the UAV 50 to advance, retreat, ascend, descend, turn and do other actions by operating the manual manipulation unit. In this way, under the control of the operator, the UAV 50 may fly and land to any desired location precisely according to the intention of the operator, for example, landing nearby the vehicle 10 or directly landing into the accommodating cabin 402 of the UAV accommodating device 40 of the vehicle 10. In the embodiment, it is preferable that the UAV receiving controller 30 is constructed into a form of a hand-held flight remote controller, so that the operator may remotely control the flight of the UAV 50 at the outside of the vehicle 10 when the UAV 50 can be observed by the operator. It should be noted that, the UAV 50 only accepts the remote control operation of the UAV receiving controller 30 of the terminal that passes the identity verification, so as to prevent the UAV 50 from being controlled by a non-target terminal.

In a second embodiment, the short distance guide unit 302 provides to the UAV 50 second navigation position information for positioning a landing position of the UAV 50, which serves as the short distance guide information. In this way, the UAV 50 may still keep all flight control rights, and the navigation system of the UAV 50 navigates the UAV 50 based on the second navigation position information to guide the UAV 50 to land. The second navigation position information may be different from the aforementioned first navigation position information, for example, the GPS position information. It may be understood that, in order to solve the problem that the accuracy of the first navigation position information is not high enough for accurate landing of the UAV 50, the position accuracy of the second navigation position information may be higher than that of the first navigation position information.

In one implementation of the second embodiment, as shown in FIG. 2, the short distance guide unit 302 includes a light emitting device 303, and an optical mark formed by the light emitting device 303 during light emission constitutes the second navigation position information. For example, the light emitting device 303 may consist of a plurality of infrared diodes. In this case, the navigation system of the UAV 50 may include an existing visual or vision navigation system, and the visual navigation system obtains images by a camera, extracts image points of the infrared diodes as feature points, and calculates the position and attitude of the optimal mark by means of a corresponding algorithm, thereby guiding the UAV 50 to accurately land at the position indicated by the optical mark. The positioning accuracy of the existing visual navigation system can reach about 10 cm. In order that the UAV 50 can land directly into the accommodating cabin 402 of the UAV accommodating device 40, the plurality of infrared diodes constituting the light emitting device 303 may be arranged around the UAV accommodating device 40. Of course, the short distance guide unit 302 may also be movable, thus may be arranged at desired location for the landing of the UAV 50. It should be noted that, in the implementation, the vehicle 10 or other terminals may be configured to drive the light emitting device 303 to work and emit light only after passing the identity verification of the UAV 50, so as to avoid the situation that the light emitting devices 303 of a plurality of terminals emit light at the same time, resulting in that the UAV 50 misjudges the landing location.

In another implementation of the second embodiment, the short distance guide unit 302 of the UAV receiving controller 30 may also be used as a wireless signal transceiver unit for transmitting the wireless signal between the vehicle 10 and the UAV 50. The wireless signal used by the short distance guide unit 302 when serving as the wireless signal transceiver unit may have information transmission function and positioning function simultaneously. For example, such wireless signal may be a UWB wireless communication signal which has a positioning accuracy of a dozen centimeters. In this way, on one hand, the wireless signal transceiver unit may transmit information with the UAV 50 by the wireless signal, for example, the wireless signal transceiver unit may receive the identity verification request sent by the UAV 50 and send the aforementioned identity verification information to the UAV 50; and on the other hand, the UAV 50 may position a signal source (i.e., the vehicle 10 having the UAV receiving controller 30) based on the transmitted wireless signal, thereby obtaining the second navigation position information.

Figure 3:
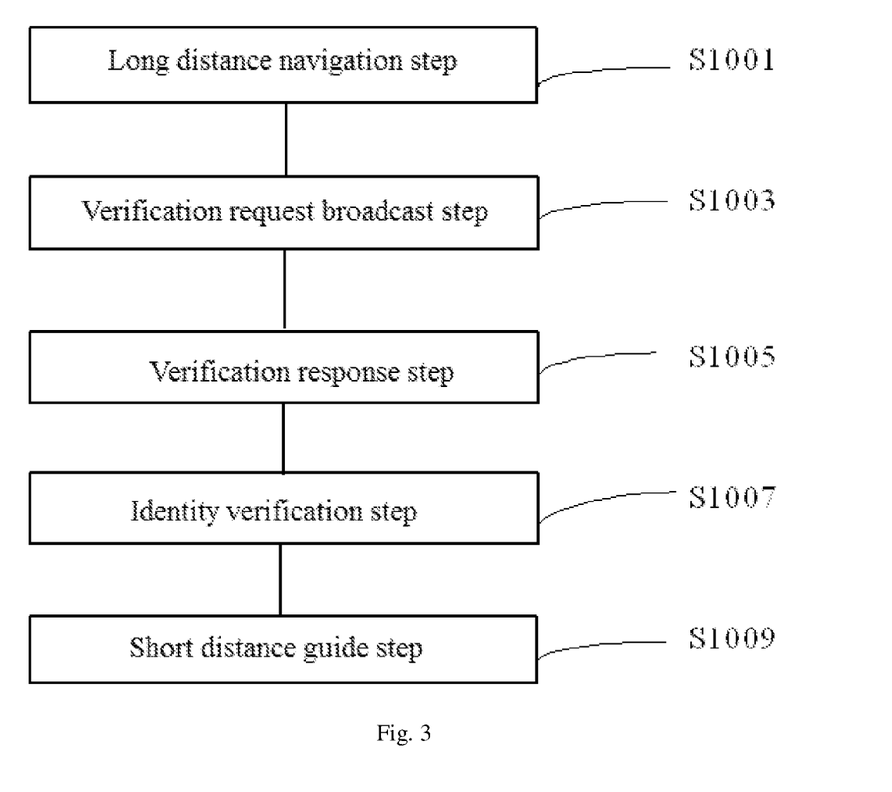
FIG. 3 is a flowchart of a cargo transport method based on an UAV according to one embodiment of the present invention.

A cargo transport method according to one embodiment of the present invention will be described below in combination with FIG. 3. The method may be realized by the aforementioned cargo transport system based on an UAV, so as to transport cargos between the vehicle and the another terminal by the UAV 50 with the navigation system. As shown in FIG. 3, the method may include a long distance navigation step S1001. In the step S1001, the navigation system of the UAV 50 carrying cargos guides the UAV 50 to fly from the another terminal 60 to the vehicle 10 according to first navigation position information (e.g., the GPS position information or the Beidou positioning position information) of the vehicle 10. The first navigation position information may be known for the another terminal 60 in advance, or may also be sent by the position information sending unit 702 of the vehicle 10 to the another terminal 60 via the wireless communication network 80. In the case that the vehicle 10 orders the cargos from the another terminal 60 (for example, the another terminal is an online retailer) by a wireless network order, the first navigation position information of the vehicle, together with the order information or serving as a part of the order information, may be sent to the another terminal 60 via the wireless communication network 80.

When the UAV 50 flies to a preset range around the vehicle 10, a verification request broadcast step S1003 is executed. In the step S1003, the UAV 50 broadcasts an identity verification request. At this time, the navigation system of the UAV 50 only knows the first navigation position information of the vehicle 10, so the preset range may be set according to the first navigation position information of the vehicle 10. For example, the preset range may be set as a spherical area range centered in a position corresponding to the first navigation position information of the vehicle 10 and with a radius of 30-200 m.

It may be understood that, it is possible that there are other terminals capable of receiving the UAV 50 exist around the vehicle 10, for example, another vehicle similar to the vehicle 10; and moreover, in the flight course of the UAV 50 to the vehicle 10, the vehicle needing to receive the UAV 50 may have moved away from the original position due to various reasons. Therefore, the UAV 50 needs to carry out identity verification on the terminals within a possible landing range thereof to determine whether the vehicle 10 about to receive the UAV 50 exists therein.

In a verification response step S1005, within the broadcast range of the identity verification request of the UAV 50, terminals including the vehicle 10 respectively respond to the identity verification request and thereby provide identity verification information to the UAV 50.

In an identity verification step S1007, the UAV 50 carries out identity verification on the received identity verification information, and determines a terminal passing the identity verification as a target terminal where the UAV is about to land. In the case that none of all identity verification information received by the UAV 50 can pass the identity verification, the UAV 50 automatically returns to the another terminal 60 that originally serves as a starting point. The identity verification carried out herein may be realized by any appropriate identity verification technology in the prior art.

In the case that the UAV 50 determines the vehicle 10 as the target terminal or the target vehicle, a short distance guide step S1009 is executed, so that the UAV 50 lands according to the short distance guide information sent by the vehicle 10.

In the short distance guide step S1009, corresponding to different short distance guide information provided by the vehicle 10, the UAV 50 may land in different modes. Just like the cargo transport system described above in combination with FIG. 1 and FIG. 2, in one implementation, the short distance guide information includes flight control information used for controlling the flight of the UAV 50, and the vehicle 10 at least partially controls the flight of the UAV 50 by the flight control information, so as to guide the UAV 50 to land. For example, the vehicle 10 may control the flight route of the UAV 50, and the flight attitude and the like of the UAV 50 are still controlled by the navigation system thereof. In another implementation, the short distance guide information may include second navigation position information for positioning a landing position of the UAV 50. In this way, the navigation system of the UAV 50 may navigate the UAV based on the second navigation position information, so as to guide the UAV to land. As mentioned above, the second navigation position information may be composed of the optimal mark formed by the light emitting device 303, or provided by the UWB wireless communication signal for the communication between the vehicle 10 and the UAV 50. It may be understood that, the position accuracy of the second navigation position information is higher than that of the first navigation position information, for example, the GPS position information. Under the guide of the vehicle 10, the UAV 50 may land on any desired position and may even land directly into the UAV accommodating device 40 arranged at the top surface of the vehicle 10.

When transporting cargos from the vehicle 10 to the another terminal 60, the position information receiving unit of the vehicle 10 may obtain the first navigation position information, for example the GPS position information, of the another terminal 60 via the wireless communication network 80, and transmits the first navigation position information to the onboard UAV 50. The navigation system of the UAV 50 guides the UAV 50 to fly to the another terminal 60 according to the obtained first navigation position information of the another terminal 60.

Although the present invention has been described above according to the situation that the vehicle 10 respectively serves as a cargo sending terminal and a cargo receiving terminal, it may be understood that the vehicle 10 may simultaneously serve as the cargo sending terminal and the cargo receiving terminal. That is, the vehicle 10 may serve as a cargo relay station of the cargos from a cargo consignor at the starting point to a cargo consignee at the destination. Therefore, the UAV accommodating device 40 of the vehicle 10 may have two adjacent parking spots each of which is for one UAV 50 to park. In this way, when one UAV 50 carrying cargos lands onto one parking spot of the vehicle 10, the UAV may transfer the cargos to another UAV 50 (the another UAV 50 has been fully charged in general, and has been parked on the other parking spot) by means of an inter-vehicle cargo transfer device (not shown) in the UAV accommodating device 40, and then the another UAV 50 carrying the cargos continues to fly towards the cargo consignee or another cargo relay station. In one embodiment, the inter-vehicle cargo transfer device in the UAV accommodating device 40 may be arranged between the two parking spots, for example, may be a conveyor belt located between the two parking spots. For the UAV 50 having a limited endurance mileage, the transport distance of the cargos may be greatly prolonged in this manner.

When the UAV 50 lands on the vehicle 10 serving as the relay station, the aforementioned necessary identity verification needs to be carried out as well. Therefore, when the cargo consignor at the starting point is intended to use the current vehicle 10 as a relay station, the cargo consignor may need to obtain the permission of the current vehicle 10 and transfer information necessary for the identity verification to the vehicle 10. This may be realized via the wireless communication network 80 as shown in FIG. 1. The cargo consignor, the cargo consignee and the relay stations including the vehicle 10 may be terminals of the wireless communication network. For example, these terminals may be riders in a rider club, and may also be friends over communication software. These terminals may approve in advance or instantly confirm whether to provide sharing support, namely whether to allow providing relay station services, when the cargo consignor plans the flight route of the UAV.

So far, those skilled in the art would recognize that, although a plurality of exemplary embodiments of the present invention have been shown and described herein in detail, however, without departing from the spirit or scope of the present invention, many other variations or modifications consistent with the principles of the present invention may also be directly determined or deduced in accordance with the contents disclosed by the present invention. Accordingly, the scope of the present invention should be understood and recognized as covering all of these other variations or modifications.

The invention claimed is:

1. A cargo transport system based on an unmanned aerial vehicle (UAV), comprising a UAV and a vehicle that can send and receive the UAV, so that cargos can be transported between the vehicle and a terminal by the UAV;
wherein the UAV is provided with a navigation system, and the navigation system can guide the UAV to fly between the vehicle and the terminal according to first navigation position information that indicates positions of the vehicle and the terminal; and
wherein the vehicle comprises:
a UAV accommodating device for accommodating the UAV; and
a UAV receiving controller configured, when the UAV flies from the terminal into a preset range around the vehicle by means of the navigation system, to guide the UAV to the vehicle based on wireless signal transmitted directly between the vehicle and the UAV, wherein the UAV receiving controller comprises:
an identity verification unit for providing identity verification information to the UAV in response to an identity verification request broadcasted by the UAV when flying into the preset range, so that the UAV determines according to the identity verification information whether the vehicle is a target vehicle where the UAV is to land; and
a short distance guide unit for providing short distance guide information for the UAV, so that the UAV lands according to the short distance guide information when the UAV determines that the vehicle is the target vehicle.

2. The cargo transport system of claim 1, wherein the vehicle further comprises a position information transceiver for transmitting the first navigation position information between the vehicle and the terminal by a wireless communication network, wherein the position information transceiver comprises:
a position information obtaining unit, configured to obtain the first navigation position information for the vehicle;
a position information sending unit, configured to send the first navigation position information of the vehicle to the terminal by the wireless communication network; and
a position information receiving unit, configured to receive the first navigation position information of the terminal via the wireless communication network.

3. The cargo transport system of claim 2, wherein the navigation system of the UAV comprises a satellite navigation system, and the first navigation position information of the vehicle and the terminal is a position information provided for the vehicle and the terminal by the satellite navigation system.

4. The cargo transport system of claim 1, wherein the preset range is set according to the first navigation position information of the vehicle.

5. The cargo transport system of claim 1, wherein the short distance guide information comprises flight control information for controlling a flight of the UAV;
the UAV receiving controller further comprises a manual manipulation unit for controlling the flight of the UAV;
wherein the short distance guide unit converts an operation of an operator on the manual manipulation unit into the flight control information and provides the flight control information to the UAV in real time, so that the UAV flies according to the operation of the operator in real time.

6. The cargo transport system of claim 1, wherein the short distance guide information comprises second navigation position information for positioning a landing position of the UAV, and the navigation system of the UAV navigates the UAV according to the second navigation position information so as to guide the UAV to land; and
the second navigation position information has a position accuracy which is higher than that of the first navigation position information.

7. The cargo transport system of claim 6, wherein the short distance guide unit comprises a light emitting device, and an optical mark formed by the light emitting device during light emission constitutes the second navigation position information.

8. The cargo transport system of claim 7, wherein the light emitting device comprises a plurality of infrared diodes; and the plurality of infrared diodes are arranged around the UAV accommodating device, so that the UAV can directly lands into the UAV accommodating device.

9. The cargo transport system of claim 6, wherein the short distance guide unit is further used as a wireless signal transceiver unit for transmitting the wireless signal between the vehicle and the UAV; wherein the second navigation position information is provided by the wireless signal itself.

10. The cargo transport system of claim 1, wherein the vehicle further comprises a UAV sending controller for controlling the UAV to take off from the vehicle; wherein the UAV sending controller comprises:
 a navigation setting unit for providing a navigation parameter for the UAV, which is necessary for the UAV to fly from the vehicle to the terminal.

11. The cargo transport system of claim 1, wherein the UAV accommodating device comprises:
 an accommodating cabin with an opening, which is arranged at a top surface of the vehicle and is used for accommodating the UAV;
 a cabin door, which is arranged at the opening of the accommodating cabin and is movable between an open position and a closed position to open or close the accommodating cabin; and
 a cabin door controller, configured to automatically control the opening and closing of the cabin door when the UAV takes off from or lands into the accommodating cabin, so as to allow the UAV to access the accommodating cabin through the opening.

12. The cargo transport system of claim 1, wherein the UAV accommodating device has two adjacent parking spots each of which is for one UAV to park.

13. The cargo transport system of claim 12, wherein the UAV accommodating device is further provided with an inter-vehicle cargo transfer device arranged between the two parking spots for exchanging cargos between two UAVs where the two UAVs are respectively parked on the two parking spots.

14. A cargo transport method for a cargo transport system based on an unmanned aerial vehicle (UAV), for transporting cargos between a vehicle and a terminal through the UAV having a navigation system, comprising:
 a long distance navigation step in which the navigation system of the UAV guides the UAV to fly from the terminal to the vehicle according to first navigation position information of the vehicle; wherein cargos to be transported from the terminal to the vehicle are loaded on the UAV;
 a verification request broadcast step in which an identity verification request is broadcasted from the UAV when the UAV flies into a preset range around the vehicle; wherein the preset range is set according to the first navigation position information of the vehicle;
 a verification response step in which within a broadcast range of the identity verification request of the UAV, the vehicle and the terminal respectively respond to the identity verification request to provide identity verification information to the UAV;
 an identity verification step in which the UAV carries out identity verification on the identity verification information, and determines one of the vehicle and the terminal passing the identity verification as a target where the UAV is to land; and
 a short distance guide step in which the UAV lands according to short distance guide information sent by the vehicle where the UAV determines the vehicle as the target.

15. The cargo transport method of claim 14, wherein in the short distance guide step, the short distance guide information comprises flight control information for controlling a flight of the UAV, and the vehicle at least partially controls the flight of the UAV by the flight control information to guide the UAV to land.

16. The cargo transport method of claim 14, wherein in the short distance guide step, the short distance guide information comprises second navigation position information for positioning a landing position of the UAV, and the navigation system of the UAV navigates the UAV according to the second navigation position information so as to guide the UAV to land; wherein the second navigation position information has a position accuracy which is higher than that of the first navigation position information.

17. The cargo transport method of claim 14, wherein in the short distance guide step, the UAV directly lands into a UAV accommodating device arranged at a top surface of the vehicle.

18. The cargo transport method of claim 14, wherein in the identity verification step, if none of all identity verification information received by the UAV can pass the identity verification, the UAV automatically returns to another vehicle or another terminal that originally serves as a starting point of the flight of the UAV.

* * * * *